J. A. LUKE.
VEHICLE SPRING.
APPLICATION FILED FEB. 2, 1920.
1,351,111.
Patented Aug. 31, 1920.
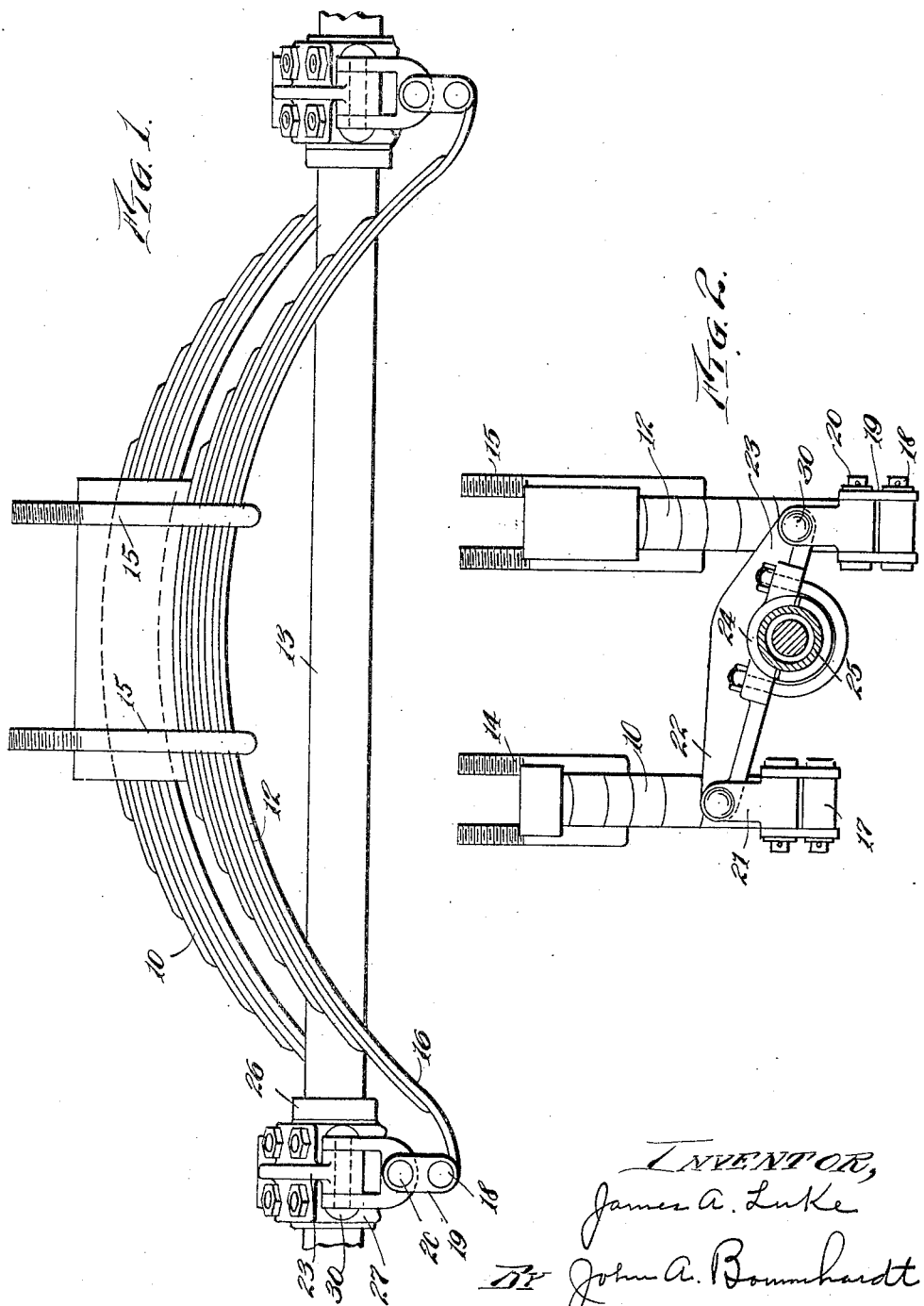

UNITED STATES PATENT OFFICE.

JAMES A. LUKE, OF CLEVELAND, OHIO.

VEHICLE-SPRING.

1,351,111.   Specification of Letters Patent.   Patented Aug. 31, 1920.

Application filed February 2, 1920. Serial No. 355,723.

*To all whom it may concern:*

Be it known that I, JAMES A. LUKE, a citizen of the United States, residing at Cleveland, in the county of Cuyahoga and State of Ohio, have invented certain new and useful Improvements in Vehicle-Springs, of which the following is a specification.

This invention relates to springs, and more particularly to that type of spring used for motor propelled vehicles and has for its object to provide a type of construction whereby the wheels of the vehicle may be secured to the body thereof in such a manner as to prevent sudden shocks or lifts of the wheel being transmitted to the body.

Further objects of the invention are to provide a construction of spring which will lend itself readily to road inequalities, and one which will easily absorb such irregularities before they reach the body of the vehicle, and the construction of a spring which will be simple, free from extra or superfluous parts and very durable and efficient.

Further objects of the invention are in part evident and will appear in part more clearly in the following description and claims.

Reference being had to the accompanying drawing wherein like reference numerals indicate similar parts of reference throughout the various views and wherein Figure 1 is an elevation of a spring constructed in accordance with the principles above set forth and Fig. 2 is a sectional end elevation of Fig. 1.

The invention consists principally of a pair of spring members 10 and 12 which occupy positions upon each side of an axle 13 and which are secured to the vehicle body by means of the U-bolts 14 and 15 the ends of which pass through the framework of the body and are secured in place by means of nuts as is customary in this type of spring. As usual in this type of spring the lower leaf 16 terminates at its end in eyes 17 through which are inserted the lower bolts 18 of shackles 19. The upper end of said shackles have secured to them by means of bolts 20, suitable clevises 21, which are in turn carried upon the ends 22 and 23 of yokes 24 rotatably secured upon the axle housing 25. The yokes 24 are prevented from any longitudinal movement upon the axle housing by means of shoulders 26 and collars 27 placed at each side thereof.

Upon referring to Fig. 2 it will be seen that the arm 22 of the yoke 24 is considerably longer than the arm 23, and in this manner any slight shocks due to irregularities in the road surface are sufficiently taken care of by the spring 10 due to the greater leverage upon the yoke 22. In this manner the bolts 30 act as a center for the axle to ride upon. Should the shock be too great it is immediately absorbed by the spring 12 and a rocking motion transmitted between the two springs thus absorbing the shock sufficiently before it is transmitted to the vehicle body. The springs therefore assist or work against each other in absorbing the shocks.

Obviously the device is capable of various modifications and I do not wish to limit myself in the construction of the same further than is required by the state of the art or that which comes within the scope of the appended claims.

I claim:

1. In a vehicle, the combination with a vehicle axle, of a pair of leaf springs placed respectively along opposite sides of said axle, and a lever fulcrumed on the axle and connected at its opposite ends to adjacent ends of each spring.

2. In a vehicle, the combination with the vehicle axle, of a pair of leaf springs adapted for connection at the middle thereof to the vehicle body, and a lever at each end of the springs, each lever being fulcrumed on the axle and connected at its opposite ends to the adjacent ends of the respective springs.

3. In a vehicle, the combination with the vehicle axle, of a pair of leaf springs adapted for connection at the middle thereof to the vehicle body, and a lever at each end of the springs, each lever being fulcrumed on the axle and connected at its opposite ends to the adjacent ends of the respective springs, the arms of said levers being unequal in length.

4. In a vehicle, the combination with the vehicle axle, of two springs located respectively at opposite sides of the axle, and a lever fulcrumed on the axle and connected at its opposite ends to the springs respectively.

5. In a vehicle, the combination with the vehicle axle, of two springs located respectively at opposite sides of the axle, and a lever fulcrumed on the axle and connected at its opposite ends to the springs respectively, the arms of said lever being unequal in length.

6. In a vehicle, the combination with the vehicle axle, of two springs at opposite sides of the axle respectively, and means connecting the springs and axle to transmit unequal portions of the weight to the springs respectively.

7. In a vehicle, the combination with the vehicle axle, of a pair of leaf springs at opposite sides thereof, and cross levers connecting adjacent ends of the springs, said levers being pivoted upon the axle.

8. In a vehicle, the combination with the vehicle axle, of a pair of leaf springs at opposite sides thereof, levers extending across and fulcrumed on the axle, and shackles connecting opposite ends of the levers and the ends of the springs.

In testimony whereof, I do affix my signature in presence of two witnesses.

JAMES A. LUKE.

Witnesses:
JOHN A. BOMMHARDT,
ROBERT L. BRUCK.